United States Patent
DeLuca (10) Patent No.: US 11,240,627 B2
(45) Date of Patent: Feb. 1, 2022

(54) PREVENTATIVE ALARM FOR POTENTIAL DEVICE DESTRUCTION USING MICROLOCATION

(71) Applicant: INTERNATIONAL BUSINESS MACHINES CORPORATION, Armonk, NY (US)

(72) Inventor: Lisa Seacat DeLuca, Baltimore, MD (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/295,515

(22) Filed: Mar. 7, 2019

(65) Prior Publication Data

US 2020/0288265 A1   Sep. 10, 2020

(51) Int. Cl.
| | |
|---|---|
| *H04M 11/04* | (2006.01) |
| *H04W 4/021* | (2018.01) |
| *G06F 11/14* | (2006.01) |
| *H04M 1/72421* | (2021.01) |

(52) U.S. Cl.
CPC ......... *H04W 4/021* (2013.01); *G06F 11/1461* (2013.01); *H04M 1/72421* (2021.01)

(58) Field of Classification Search
CPC .............. H04W 4/021; G06F 11/1461; H04M 1/72538
USPC .................................................... 455/404.1
See application file for complete search history.

(56) References Cited

U.S. PATENT DOCUMENTS

| | | | |
|---|---|---|---|
| 7,737,839 B1* | 6/2010 | Jones | D06F 93/005 340/539.1 |
| 8,866,607 B2 | 10/2014 | Velusamy | |
| 9,159,217 B1 | 10/2015 | Logan et al. | |
| 9,392,404 B2 | 7/2016 | Daoura et al. | |
| 2012/0086574 A1 | 4/2012 | Blumel et al. | |
| 2015/0056858 A1* | 2/2015 | Guo | H01R 12/722 439/607.35 |
| 2015/0170496 A1* | 6/2015 | King | G08B 21/24 340/686.6 |
| 2016/0292464 A1* | 10/2016 | Alarabi | H04W 12/12 |
| 2018/0068392 A1* | 3/2018 | Bowes | H04M 15/58 |

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

*Primary Examiner* — Huy C Ho
(74) *Attorney, Agent, or Firm* — Robert D. Bean (57) ABSTRACT

The present invention may include designating one or more potentially dangerous conditions, regions, or objects as risk factors within a venue, tracking the location of the user's mobile devices in relation to the risk factors, and monitoring the risk of damage posed to the mobile devices by the risk factors; if the risk of damage exceeds a threshold, alerting the user to the presence of the risk factor and the potential danger to the mobile device. The present invention may further involve, responsive to the user's actions and the risk of potential device damage, performing one or more precautionary actions to reduce or prevent data loss or damage to the mobile device.

20 Claims, 6 Drawing Sheets

PREVENTATIVE ALARM FOR POTENTIAL DEVICE DESTRUCTION USING MICROLOCATION

BACKGROUND

The present invention relates, generally, to the field of computing, and more particularly to the Internet of Things.

The Internet of Things (IoT) is a collection of devices such as vehicles, home appliances, computers, mobile devices, sensors, and any real-world object embedded with networking technology which are capable of connecting, interacting, and exchanging data with each other over a network. IoT technology allows multiple devices to work together and accomplish tasks or provide information far beyond the capabilities of each individual device. As IoT technologies have evolved, they have revolutionized such fields as home automation, manufacturing, agriculture, transportation, medicine, healthcare, energy management and more. Wherever there are two or more connected devices, IoT technology may be harnessed to solve problems.

SUMMARY

According to one embodiment, a method, computer system, and computer program product for operating one or more connected devices to prevent potential mobile device damage is provided. Embodiments of the present invention may include designating one or more potentially dangerous conditions, regions, or objects as risk factors within a venue, tracking the location of the user's mobile devices in relation to the risk factors, and monitoring the risk posed to the mobile devices by the risk factors; if the risk exceeds a threshold, alerting the user to the presence of the risk factor and the potential danger to the mobile device. The present invention may further involve, responsive to the user's actions and the risk of potential device damage, performing one or more precautionary actions to reduce or prevent data loss or damage to the mobile device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the Internet of Things. The following described exemplary embodiments provide a system, method, and program product to, among other things, alert a user and take precautionary steps when a mobile device is at risk of being damaged. Therefore, the present embodiment has the capacity to improve the technical field of the Internet of Things by leveraging networking technologies and multiple sources of information to intelligently assess danger, operate the mobile device to reduce the risk of damage or data loss, and to prevent mobile devices from being damaged or destroyed.

As previously described, the Internet of Things (IoT) is a collection of devices such as vehicles, home appliances, computers, mobile devices, sensors, and any real-world object embedded with networking technology which are capable of connecting, interacting, and exchanging data with each other over a network. IoT technology allows multiple devices to work together and accomplish tasks or provide information far beyond the capabilities of each individual device. As IoT technologies have evolved, they have revolutionized such fields as home automation, manufacturing, agriculture, transportation, medicine, healthcare, energy management and more. Wherever there are two or more connected devices, IoT technology may be harnessed to solve problems.

In IoT device-rich environments, it is common for IoT devices to be damaged or destroyed by user error, accidents, and other such tragedies. For instance, users accidentally launder mobile devices such as cell phones, activity trackers, smart watches, et cetera on a regular basis. In construction zones or factories cell phones may be damaged by vehicles, industrial machines, or other hazards. As such, it may be advantageous to, among other things, implement a system that alerts the user of a mobile device that they are about to potentially damage or destroy their device when in a location that might cause harm, and if the user's reaction is insufficient in time, act to mitigate data loss or damage.

A method, system, and computer program product are disclosed for alerting a user when a device that is not intended to be exposed to certain conditions is at risk. In various embodiments, a user designates one or more potentially dangerous conditions, scenarios, or objects as risk factors within a venue such as a home, a factory, a construction site, et cetera. Location sensors track the location of the user's mobile devices in relation to the risk factors, and monitor the risk posed to the mobile devices by the risk factors (herein referred to as the 'risk,' 'risk of damage,' or 'damage risk'). If the risk exceeds a threshold, the system alerts the user to the presence of the risk factor and the potential danger to the mobile device. In the event that the user fails to heed the alert, performs actions indicating a desire for assistance, or otherwise does not act to intervene, the system performs various actions to reduce or prevent data loss, damage, or destruction of the device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to alert a user and take precautionary steps when a mobile device is at risk of being damaged.

Figure 1:
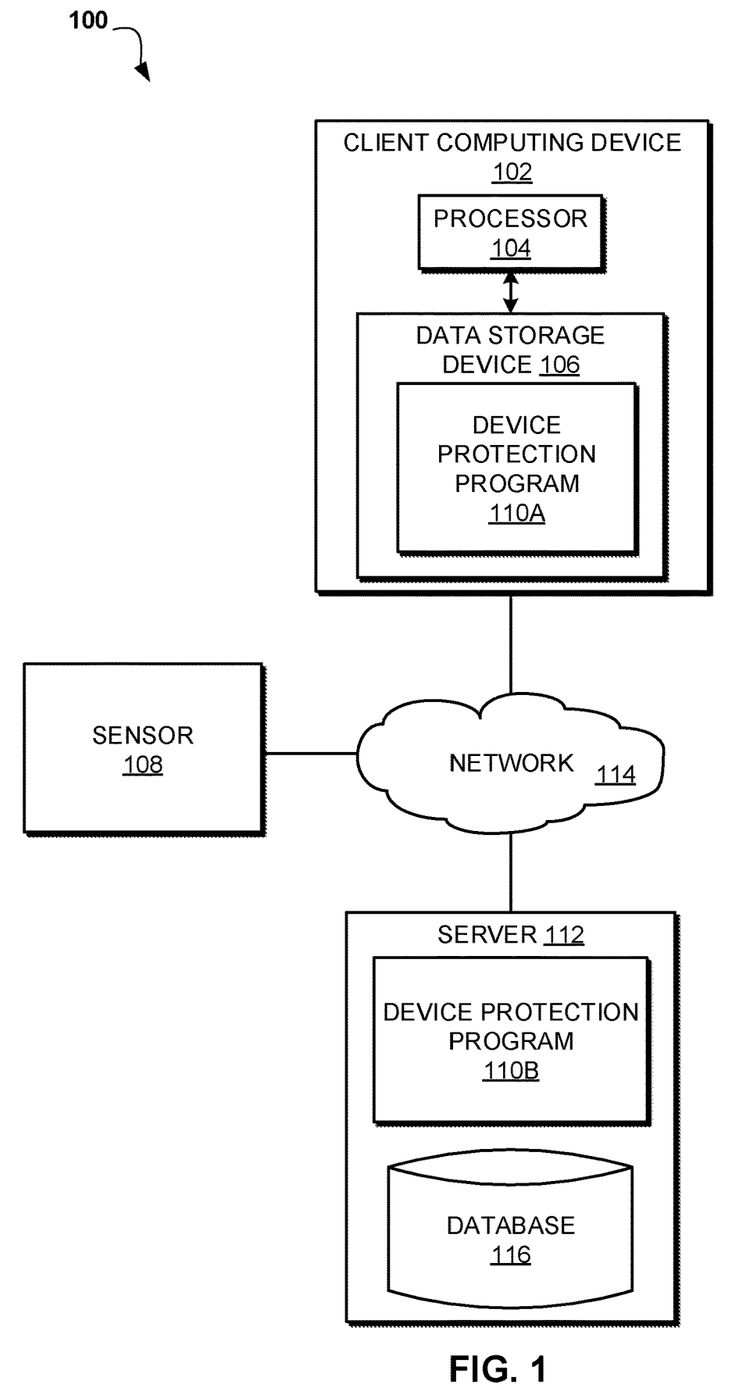
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a device protection program 110A and communicate with the server 112 via the communication network 114, in accordance with one embodiment of the invention. Client computing device 102 may be, for example, a mobile device, a wearable device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a device protection program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Sensor 108 may be any sensor equipped with networking technology and capable of communicating with client computing device 102 and/or server computer 112 over network 114. Sensor 108 may be a location sensor capable of tracking the location of one or more mobile devices, for instance via Bluetooth, RFID tags applied to the device to be tracked, wireless signal strength emitted from the mobile device, et cetera.

According to the present embodiment, the device protection program 110A, 110B may be a program enabled to alert a user and take precautionary steps when a mobile device is at risk of being damaged. The device protection program 110A, 110B may be located on client computing device 102 or server 112 or on any other device located within network 114. Furthermore, device protection program 110A, 110B may be distributed in its operation over multiple devices, such as client computing device 102 and server 112. The device protection method is explained in further detail below with respect to FIG. 2.

Figure 2:
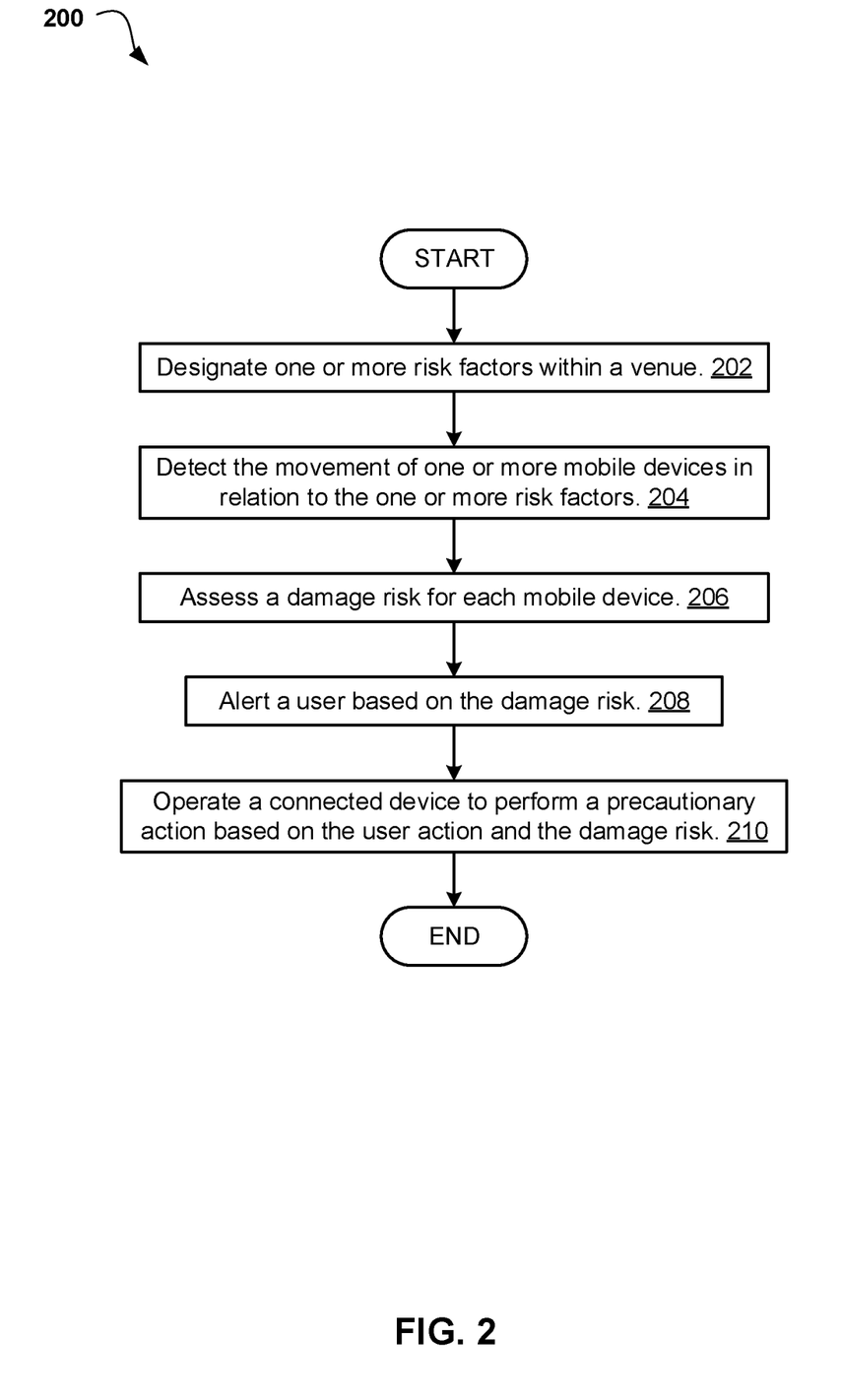
FIG. 2 is an operational flowchart illustrating a device protection program process according to at least one embodiment.

Referring now to FIG. 2, an operational flowchart illustrating a device protection program process 200 is depicted according to at least one embodiment. At 202, the device protection program 110A, 110B designates one or more risk factors within a venue. A risk factor may be any condition, object, or region that may pose a risk to a mobile device. For instance, a risk factor could be a dangerous device such as a washing machine, dryer, construction vehicle, factory equipment, sauna, et cetera. A risk factor could also be a condition such as rain, high or low temperatures, humidity, exposure to water or other potentially harmful substances, et cetera. Risk factors may further be a dangerous region such as a trafficked roadway, lake, or deep hole. A user may designate a risk factor by creating a data entry within or accessible to device protection program 110A, 110B containing at least the name of the risk factor and its location, for instance in the form of coordinates. The user may also add descriptive information that would be relevant in assessing the risk that the risk factor might pose to a mobile device; for instance, the means by which the risk factor might damage a mobile device (water damage, crushing, etc.), or other details, such as the hours of operation of a potentially destructive factory device, the depth of a body of water, et cetera. The risk factors may also be dynamically updated at intervals or based on changes in conditions. For instance, where the risk factor is a connected device (a connected device may be any device, including client computing device 102, server 112, sensor 108, and the mobile device which is to be protected from harm, which is connected to network 114 or another device) such as a smart appliance or connected factory device, device protection program 110A, 110B may update the data entry pertaining to that risk factor based on information received from the connected device itself, such as whether the device is on or off at any given time, or, in the case of a risk factor capable of movement (vehicle, destructive animal, et cetera), the real-time position of the risk factor. The device protection program 110A, 110B may even use analytics to determine times of day or scenarios when a connected device risk factor is most likely to be in a dangerous or safe state.

A venue may be any location where risk factors may exist and where one or more of a user's mobile devices may be brought into contact with the risk factors, such as a home, a construction site, a factory, a school, a store, et cetera. For purposes of implementation, venue may be a tag appended onto the risk factor data entry to unite risk factors within similar contextual and geographical settings. The venue may also be equipped with one or more sensors 108 and may further be defined by coverage of network 114. In some embodiments, the venue may be divided into zones based on the presence of sensors 108, the presence of risk factors, or other contextual divisions (such as rooms of a house, divisions of a factory floor, regions of a construction site).

In some embodiments, rather than or in addition to risk factors designated by the user, device protection program 110A, 110B may receive previously designated risk factors over network 114. Furthermore, a risk factor may be specified by the manufacturer of a connected device such as through warranty, operating manuals, or user specification. In other embodiments, risk factors may be automatically detected by sensor 108 or inferred from data accessed over network 114. For instance, sensor 108 may be a thermometer, and may register a temperature that is extreme enough to potentially damage a device; in response, device protection program 110A, 110B may automatically designate the region around sensor 108 as a risk factor. In another example, where sensor 108 is a camera, device protection program 110A, 110B may use computer vision to recognize a puddle of water within a house and designate it as a risk factor. Additionally, device protection program 110A, 110B may draw on weather data accessible to network 114 to designate outdoor unsheltered regions as containing a risk factor during rainstorms, extreme temperatures, and other potentially destructive weather events. As another example, if a potentially destructive smart home device, such as a smart washer, smart dryer, or smart sprinkler is connected to the same network 114 as a mobile device, device protection program 110A, 110B may automatically designate that device as a risk factor. The device protection program 110A, 110B may automatically designate connected devices as risk factors based on a provided list of smart devices that are considered potentially dangerous.

At 204, the device protection program 110A, 110B detects the movement of one or more mobile devices in relation to the one or more risk factors. The device protection program 110A, 110B may monitor the location of one or more mobile devices based on sensors integrated with the devices such as accelerometers, and/or by triangulation or GPS navigation. The device protection program 110A, 110B may also use location sensors installed within a venue to track the location of the mobile devices, for instance using microlocation technology such as RFID tags, Bluetooth beacons, et cetera. The device protection program 110A, 110B may track all mobile devices connected to network 114, potentially as identified from a pre-supplied list of mobile devices or as inferred or identified by information provided by the devices themselves. The device protection program 110A, 110B may alternatively track devices explicitly designated by a user. In some embodiments, device protection program 110A, 110B may track devices or objects which are not themselves connected to network 114, but are equipped with technology to allow for the device or object to be tracked, such as an RFID tag or radio beacon.

At 206, the device protection program 110A, 110B assesses a damage risk for each mobile device. The damage risk, may be the likelihood that the mobile device could be damaged by a given risk factor. At its most basic, the damage risk may be based on the proximity of the mobile device to a risk factor; for instance, the damage risk may increase linearly as the mobile device approaches the location of a risk factor. However, the damage risk may be modified to take into account many other factors in order to produce a more accurate assessment of the risk of damage posed to the mobile device. For instance, device protection program 110A, 110B may take into account historical data in assessing the damage risk posed to a mobile device by a risk factor, including number of times the risk factor has damaged the devices of a user in the past, the number of times similar risk factors have damaged mobile devices in the past, trends or conditions affecting damage inflicted on devices such as weather, light levels, time of day or year, et cetera. The device protection program 110A, 110B may also consider fitness information of a user, such as steps walked, heart rate, amount of sleep, et cetera, to infer aspects of a user's mental state, such as the alertness of user, fatigue of user, et cetera, and thereby adjust damage risk. For instance, a sleepy or fatigued user may be more absent-minded and prone to laundering a mobile device, and therefore the damage risk posed by a washing machine may be greater when the user is in such a state. The device protection program 110A, 110B may also consider age of the user in determining damage risk. Such user information may be obtained or inferred, with user's permission, from a user's activity tracker, accelerometer data, input by a user, or any other source.

In some embodiments, device protection program 110A, 110B may also take into account the location of a mobile device relative to a second mobile device in determining damage risk; if a user regularly carries more than one mobile device, such as a second cell phone, a wearable activity tracker, a smart headset, and/or a smart watch, device protection program 110A, 110B may infer changes to damage risk based on the movement of the first mobile device to the second. For instance, if a user usually carries a mobile phone and a smart watch, the position of the two is usually the same. If one of the mobile devices stops moving relative to the other, than the user may have put down and left unattended the stationary mobile device. If the stationary mobile device is located near a risk factor, such as a laundry machine, the user may have forgotten about the stationary mobile device, and the risk of the stationary mobile device being absently laundered may increase. The device protection program 110A, 110B may likewise infer when a mobile device is unattended from sensor readings; for instance, if accelerometer readings or movements identified via location tracking cease for a threshold amount of time, such as 10 seconds, device protection program 110A, 110B may infer that the mobile device is no longer on the person of a user, and may increase the damage risk if the mobile device is near a risk factor.

The device protection program 110A, 110B may also consider the physical characteristics of a mobile device in determining the risk posed by a given risk factor or class of risk factors. For instance, if a mobile device is designed to operate within a high-temperature environment, the device's proximity to a high-temperature risk factor may have a reduced or negated effect on the danger risk. Additionally, if a mobile device is waterproof or equipped with a waterproof case, risk factors such as puddles of water or rain may no longer affect the damage risk, and if the mobile device or case is rated to a specific depth, bodies of water designated as risk factors that are shallower than the rated depth may not affect the damage risk. The device protection program 110A, 110B may be provided with the physical characteristics of the device, such as operational ranges, whether the device is waterproof or water-resistant, depth ranges of waterproofing, shock resistance/rating, and presence and protective qualities of a protective case by user input, mobile device literature or specifications accessible to device protection program 110A, 110B, et cetera.

In simpler embodiments, where the venue is divided into zones, damage risk may be assessed per zone; for instance, a damage risk will be assessed for each zone based on the number of risk factors, or in some embodiments on the magnitude of the danger posed to the mobile device by each risk factor, and the damage risk to the mobile device at any given moment will be dependent on the zone within which the mobile device is located.

At 208, the device protection program 110A, 110B alerts a user based on the damage risk. The alert may be triggered by the damage risk exceeding a threshold amount; the threshold amount may be set by a user, or may be provided to or obtained by device protection program 110A, 110B from a source on network 114 such as a webpage, service, database, et cetera, and may be based on the level of risk the user is willing to accept or may be established based on historical trends for a particular device and/or risk factor. The device protection program 110A, 110B may operate one or more connected devices to alert the user, such as tablets, cell phones, smartwatches, and desktop computers. In some embodiments, device protection program 110A, 110B may infer the location of a user from one or more mobile devices and utilize connected devices within the same zone or within a threshold distance of the user's location to alert the user. The device protection program 110A, 110B may send text popups or notifications to one or more mobile devices, trigger an audible alarm or voice alert, cause mobile devices to vibrate or flash, change colors on a display, et cetera. In some embodiments, the intensity of the alarm may be based on the damage risk; for example, as the damage risk increases, the vibration may increase in magnitude, the volume of an auditory alert may increase, flashing may get brighter and/or more frequent, popups or text alerts may increase in size or change color, and so forth. In some embodiments, the number of connected devices producing the alert may increase. In some embodiments, if a mobile device is equipped with an accelerometer and the device acceleration is continuous, device protection program 110A, 110B may infer that the mobile device is still on the person of the user and therefore may not trigger an alert even when the damage risk exceeds the threshold. The user may disable the alert by providing some input to device protection program 110A, 110B acknowledging the alert, such as by pressing 'ignore' on a text popup, issuing a voice command to a voice assistant, et cetera.

At 210, the device protection program 110A, 110B operates a connected device to perform one or more precautionary actions based on the user action and the damage risk. A user action may be any action of the user either explicit, such as a response to a text prompt, an auditory response to a voice assistant, et cetera, or inferred, such as by sensor/location information from mobile devices; movement of the user may be inferred from the movement or accelerometer readings of devices usually on the person of the user, and rescue action may be inferred based on sudden changes in location data or sensor readings from the endangered mobile device. In the case of inaction by the user during a predetermined period of time, such as where a user fails to respond to a text or auditory alert, and/or where mobile devices usually associated with the user's person remain stationary, or where a user issues a voice command or responds to a text prompt indicating a desire for device protection program 110A, 110B to try and protect the device, device protection program 110A, 110B may perform a precautionary action. The predetermined period of time that device protection program 110A, 110B might wait for user action may be pre-supplied by the user and/or may be based on the damage risk. A precautionary action may be any action which may reduce the risk of damage to the mobile device, or which may prevent loss of data from the mobile device. For example, device protection program 110A, 110B may copy data from the mobile device to a remote location to preserve the data in case the mobile device is damaged or destroyed. The device protection program 110A, 110B may also increase the intensity of the alert, alert a second user who may be pre-designated by the first user, or remotely shutting down the mobile device. In the case where the damage risk is affected by a connected device, such as a smart washer, device protection program 110A, 110B may shut down, stop, or otherwise perform an action to neutralize the danger posed by the connected device.

Figure 3:
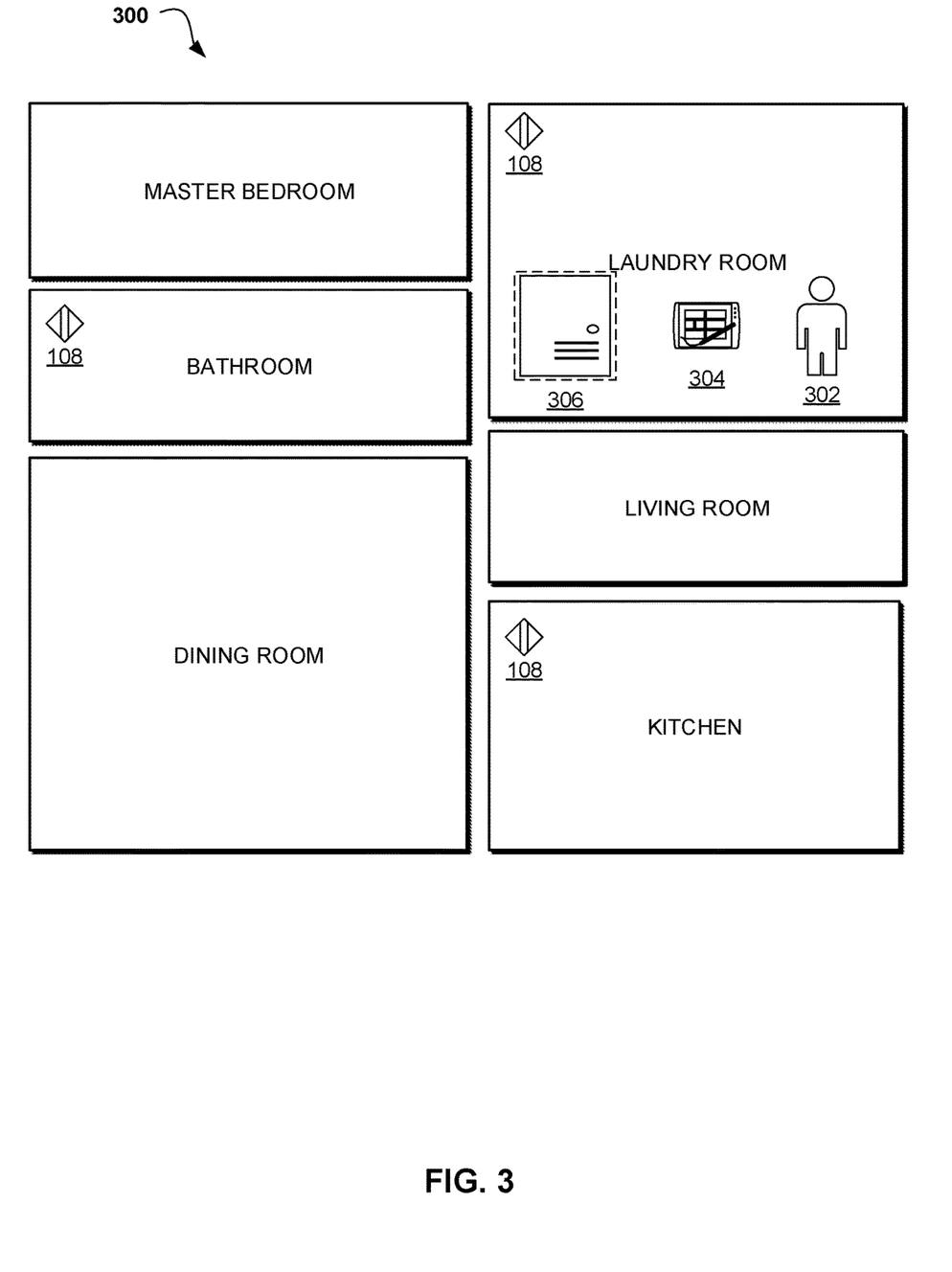
FIG. 3 depicts an exemplary device protection use environment in accordance with at least one embodiment.

Referring now to FIG. 3, an exemplary device protection use environment 300 is depicted in accordance with at least one embodiment. Device protection use environment 300 is a venue, in this case a home, comprising a user 302 equipped with a mobile device 304 which is running device protection program 110A, 110B. Sensors 108 are installed in various rooms within the home. The laundry room contains a washing machine 306. In various embodiments of the invention, washing machine 306 may be designated as a risk factor. In some embodiments of the invention, each room of the venue could be designated as a zone. The following example illustrates an embodiment of an implementation of the device protection system:

Anna 302 enters the laundry room. The device protection program 110A, 110B recognizes that Anna's mobile device 304, a fitness tracker, is very close to washing machine 306, and as a result assesses the damage risk of mobile device 304 to exceed the threshold required to trigger an alert. However, device protection program 110A, 110B recognizes that mobile device 304 is still tracking Anna's steps, and infers that Anna 302 is still wearing the mobile device 304, so device protection program 110A, 110B does not trigger an alert. However, the mobile device 304 soon stops showing a change in the sensor readings; after 10 seconds without readings from mobile device 304, device protection program 110A, 110B infers that mobile device 304 has been disconnected from Anna 302 or is in a pocket or otherwise attached to clothing that Anna 302 has begun sorting to begin doing laundry. The device protection program 110A, 110B triggers mobile device 304 to buzz and sends her a text warning on her cell phone. Anna 302 fails to heed the alerts and places the mobile device 304 into washing machine 306. The device protection program 110A, 110B plays a loud alarm sound on Anna's cell phone and shuts down the mobile device 304 Anna 302 responds to the alarm and retrieves the mobile device 304 just as it has begun to get wet, but damage was prevented because it was powered off.

It may be appreciated that FIGS. 2-3 provide only an illustration of one implementation and do not imply any limitations with regard to how different embodiments may be implemented. Many modifications to the depicted environments may be made based on design and implementation requirements.

Figure 4:
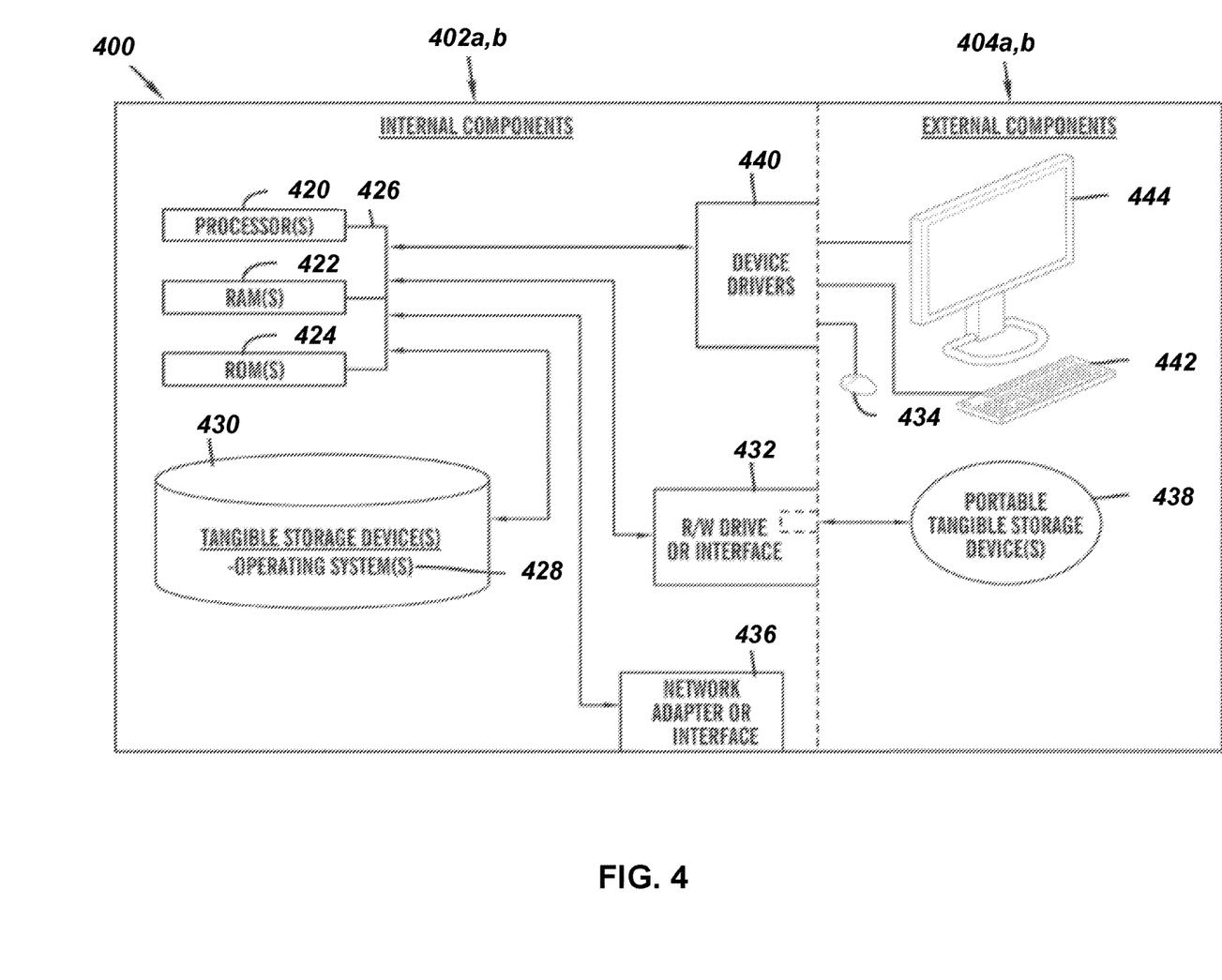
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 *a,b* and external components 404 *a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428 and the device protection program 110A in the client computing device 102, and the device protection program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 *a,b* also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the device protection program 110A, 110B, can be stored on one or more of the respective portable computer-readable tangible storage devices 438, read via the respective R/W drive or interface 432, and loaded into the respective hard drive 430.

Each set of internal components 402 *a,b* also includes network adapters or interfaces 436 such as a TCP/IP adapter cards, wireless Wi-Fi interface cards, or 3G or 4G wireless interface cards or other wired or wireless communication links. The device protection program 110A in the client computing device 102 and the device protection program 110B in the server 112 can be downloaded to the client computing device 102 and the server 112 from an external computer via a network (for example, the Internet, a local area network or other, wide area network) and respective network adapters or interfaces 436. From the network adapters or interfaces 436 and the device protection program 110A in the client computing device 102 and the device protection program 110B in the server 112 are loaded into the respective hard drive 430. The network may comprise copper wires, optical fibers, wireless transmission, routers, firewalls, switches, gateway computers and/or edge servers.

Each of the sets of external components 404 *a,b* can include a computer display monitor 444, a keyboard 442, and a computer mouse 434. External components 404 *a,b* can also include touch screens, virtual keyboards, touch pads, pointing devices, and other human interface devices. Each of the sets of internal components 402 *a,b* also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
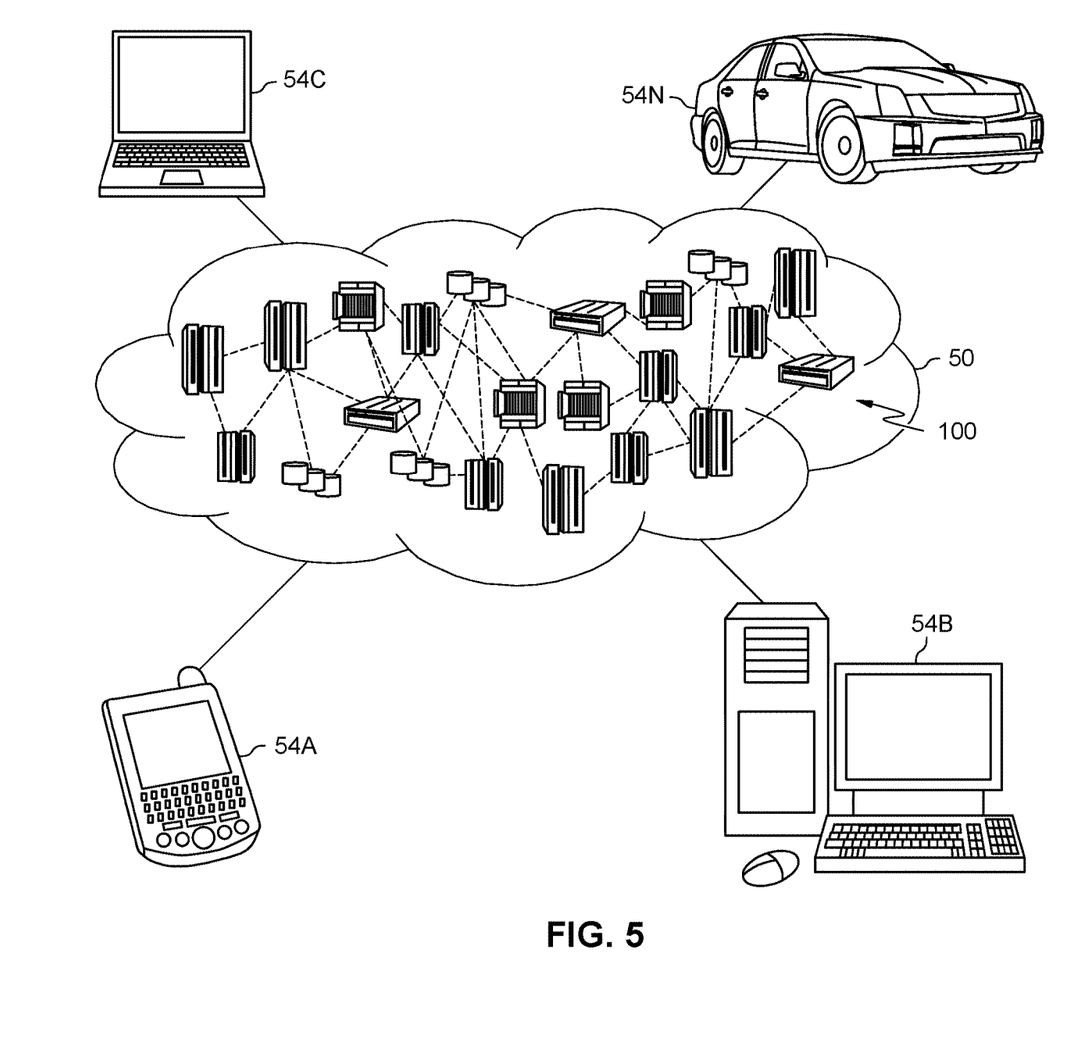
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
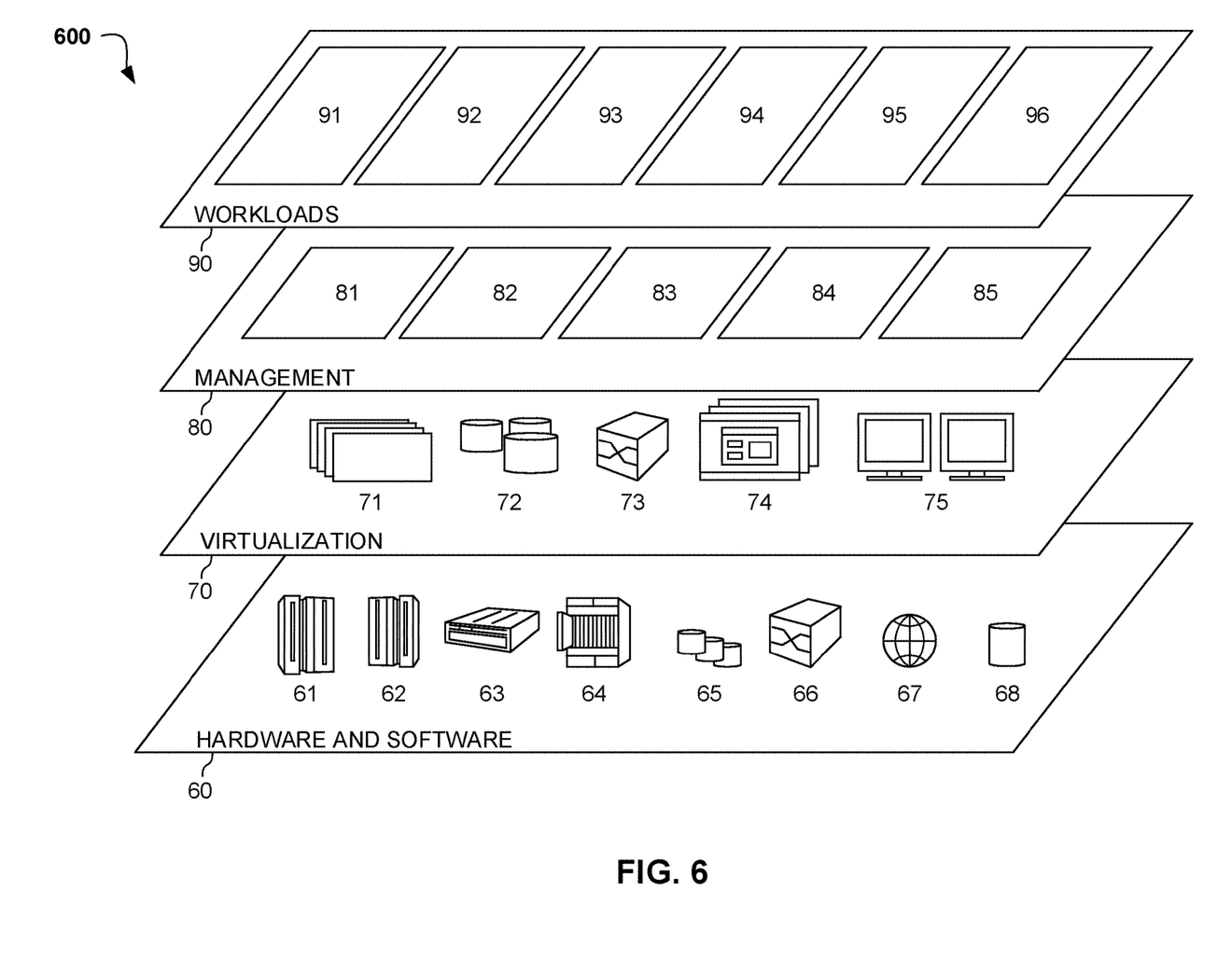
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device protection program 96. The device protection 96 may relate to alerting a user and taking precautionary steps when a mobile device is at risk of being damaged.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for operating one or more devices to prevent potential mobile device damage, the method comprising:
    determining whether a mobile device is on a person of a user;
    operating a device to alert a user based on a potential risk of damage of the mobile device exceeding a threshold, wherein the threshold is based on historical trends for the mobile device and one or more risk factors, and wherein the potential risk of damage is based on a plurality of elements comprising the determining, historical data, and a location or movement of the mobile device relative to the one or more risk factors within a venue, and wherein the risk factors are dynamically updated based on changing conditions.

2. The method of claim 1, further comprising:
    responsive to a user action status and the potential risk of damage, operating one or more devices to perform one or more precautionary actions.

3. The method of claim 2, wherein the one or more precautionary actions comprise one or more actions selected from a list consisting of:
    copying data from the mobile device, increasing an intensity of the alert, alerting a second user, operating one or more additional devices to produce the alert, shutting down the mobile device, and shutting down one or more devices that affect the risk of damage.

4. The method of claim 1, wherein determining whether the mobile device is on the person of the user is based on a location of the mobile device relative to a second mobile device.

5. The method of claim 1, wherein a factor of the potential risk of damage is a plurality of fitness information of a user.

6. The method of claim 1, wherein a factor of the potential risk of damage is one or more physical characteristics of the mobile device.

7. The method of claim 1, wherein an intensity of the alert is based on the potential risk of damage.

8. A computer system for operating one or more devices to prevent potential mobile device damage, the computer system comprising:
one or more processors, one or more computer-readable memories, one or more non-transitory computer-readable tangible storage medium, one or more sensors, and program instructions stored on at least one of the one or more tangible storage medium for execution by at least one of the one or more processors via at least one of the one or more memories, wherein the computer system is capable of performing a method comprising:
determining whether a mobile device is on a person of a user;
operating a device to alert a user based on a risk of damage of the mobile device exceeding a threshold, wherein the threshold is based on historical trends for the mobile device and one or more risk factors, and wherein the potential risk of damage is based on a plurality of factors comprising the determining, historical data, and a location or movement of the mobile device relative to the one or more risk factors within a venue, and wherein the risk factors are dynamically updated based on changing conditions.

9. The computer system of claim 8, further comprising:
responsive to a user action status and the potential risk of damage, operating one or more devices to perform one or more precautionary actions.

10. The computer system of claim 9, wherein the one or more precautionary actions comprise one or more actions selected from a list consisting of:
copying data from the mobile device, increasing an intensity of the alert, alerting a second user, operating one or more additional devices to produce the alert, shutting down the mobile device, and shutting down one or more devices that affect the risk of damage.

11. The computer system of claim 8, wherein determining whether the mobile device is on the person of the user is based on a location of the mobile device relative to a second mobile device.

12. The computer system of claim 8, wherein a factor of the potential risk of damage is a plurality of fitness information of a user.

13. The computer system of claim 8, wherein a factor of the potential risk of damage is one or more physical characteristics of the mobile device.

14. The computer system of claim 8, wherein an intensity of the alert is based on the potential risk of damage.

15. A computer program product for operating one or more devices to prevent potential mobile device damage, the computer program product comprising:
one or more non-transitory computer-readable tangible storage medium and program instructions stored on at least one of the one or more tangible storage medium, the program instructions executable by a processor to cause the processor to perform a method comprising:
determining whether a mobile device is on a person of a user;
operating a device to alert a user based on a risk of damage of the mobile device exceeding a threshold, wherein the threshold is based on historical trends for the mobile device and one or more risk factors, and wherein the potential risk of damage is based on a plurality of factors comprising the determining, historical data, and a location or movement of the mobile device relative to the one or more risk factors within a venue, and wherein the risk factors are dynamically updated based on changing conditions.

16. The computer program product of claim 15, further comprising:
responsive to a user action status and the potential risk of damage, operating one or more devices to perform one or more precautionary actions.

17. The computer program product of claim 16, wherein the one or more precautionary actions comprise one or more actions selected from a list consisting of:
copying data from the mobile device, increasing an intensity of the alert, alerting a second user, operating one or more additional devices to produce the alert, shutting down the mobile device, and shutting down one or more devices that affect the potential risk of damage.

18. The computer program product of claim 15, wherein determining whether the mobile device is on the person of the user is based on a location of the mobile device relative to a second mobile device.

19. The computer program product of claim 15, wherein a factor of the potential risk of damage is a plurality of fitness information of a user.

20. The computer program product of claim 15, wherein a factor of the potential risk of damage is one or more physical characteristics of the mobile device.

* * * * *